US006796802B2

(12) United States Patent
Iwata

(10) Patent No.: US 6,796,802 B2
(45) Date of Patent: Sep. 28, 2004

(54) MOUNTING STRUCTURE FOR VEHICLE ELECTRICAL CONNECTION BOX

(75) Inventor: Yoshifumi Iwata, Shizuoka-ken (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 09/987,879

(22) Filed: Nov. 16, 2001

(65) Prior Publication Data

US 2002/0061677 A1 May 23, 2002

(30) Foreign Application Priority Data

Nov. 17, 2000 (JP) ....................................... 2000-351476

(51) Int. Cl.[7] ................................................ H02G 3/02

(52) U.S. Cl. ......................... 439/34; 439/475; 361/752; 174/52.1

(58) Field of Search ................................ 439/475, 76.2, 439/34, 923; 280/422; 180/279; 200/61.08, 300; 174/50, 50.54, 52.1; 361/752

(56) References Cited

U.S. PATENT DOCUMENTS 6,085,598 A * 7/2000 Baba et al. ................... 73/756
6,670,549 B1 * 12/2003 Wohlfahrt et al. ......... 174/52.2
6,728,110 B2 * 4/2004 Koyama ..................... 361/752

FOREIGN PATENT DOCUMENTS

JP 4-58033 5/1992
JP 6-31327 4/1994

* cited by examiner

*Primary Examiner*—Renee Luebke
(74) *Attorney, Agent, or Firm*—Oblon, Spivak, McClelland, Maier & Neustadt, P.C.

(57) ABSTRACT

An electrical connection box 20 is arranged rearward of and in the vicinity of a dash panel 13, and is fixed to a cowl side panel 15 via mounting members 23, 24 extended from a box body 21. The box body 21 of the electrical connection box 20 is formed with a protruding member 22 for receiving impact from the dash panel 13 before the box body 21 does upon collision of the vehicle. The mounting members 23, 24 are formed to have such a rigidity as to allow the members 23, 24 to be broken to prevent the box body 21 from being crushed when the protruding member 22 receives impact, and load exceeding a predetermined limit is applied to the box body 21. The breakage of the electrical connection box upon collision of the vehicle is thereby minimized.

14 Claims, 4 Drawing Sheets

MOUNTING STRUCTURE FOR VEHICLE ELECTRICAL CONNECTION BOX

BACKGROUND OF THE INVENTION

1. Field of the Invention

This invention relates to a mounting structure for a vehicle electrical connection box for supplying power to vehicle electrical components including door lock units.

2. Description of the Related Art

A vehicle such as an automobile has an electrical connection box mounted as a relay means for supplying power to various vehicle electrical components. For example, the electrical connection box for vehicle electrical components including door lock units is, in many cases, mounted to a cowl side because of limitations in mounting space and for the optimization of power distribution to each electrical component.

FIG. 1 shows a conventional mounting structure for an electrical connection box as described in Japanese Utility Model Laid-Open Publication No. 4-58033. In FIG. 1, reference numeral 1 denotes a dash panel serving as a partition between the engine space in the front portion of the vehicle and the compartment rearward thereof, 2 a cowl side panel, and 6 an indicator panel. An electrical connection box 3 is screwed to the side panel 2 via a mounting member 5 extended from a box body 4.

SUMMARY OF THE INVENTION

When the vehicle with the electrical connection box 3 mounted to the cowl side as described above comes into collision with something at its front portion, the dash panel 1 is pushed by a component of the engine space (such as the engine) in a rearward direction, directly impacting on the box body 4. The dash panel 1 pushed back further crushes in on the mounting space of the electrical connection box 3, destroying the box body 4 in a stroke. As a result, power supply to the vehicle electrical components stops, and the door locks etc. cannot be released, preventing the speedy rescue of the vehicle's occupants.

It is an object of this invention to provide a mounting structure for a vehicle electrical connection box which can minimize damage to the electrical connection box when the vehicle receives impact upon collision or the like, in order to protect circuits inside the box, thereby maintaining power supply to each load.

According to a first technical aspect of this invention, there is provided a mounting structure for a vehicle electrical connection box, for protecting the electrical connection box upon collision of the vehicle, having a protruding member provided to a box body of the electrical connection box, the protruding member being arranged to receive the impact of a collision before the box body does, and at least one mounting member extended from the box body and fixed to a part of the vehicle at the front end thereof, wherein, a portion of force of the impact received by the protruding member acts on the mounting member in a direction intersecting a longitudinal direction of the mounting member.

According to a second technical aspect of this invention, there is provided a mounting structure for a vehicle electrical connection box which is arranged rearward of and in the vicinity of a dash panel serving as a partition between the engine space of the vehicle and the adjacent compartment, having a protruding member provided to a box body of the electrical connection box, the protruding member being arranged to receive the impact of a collision of the vehicle before the box body does, and at least one mounting member extended from the box body and fixed to a part of the vehicle at a front end thereof, wherein, the electrical connection box is fixed to a cowl side panel via the mounting member extended from the box body, and a portion of force of the impact received by the protruding member acts on the mounting member in a direction intersecting a longitudinal direction of the mounting member.

According to a third technical aspect of this invention, the protruding member is provided with at least one reinforcing rib extending along the direction in which the impact is transmitted.

According to a fourth technical aspect of this invention, at least a portion of the mounting member extends in a direction perpendicular to the direction in which the impact is transmitted upon collision of the vehicle.

BRIEF DESCRIPTION OF THE ACCOMPANYING DRAWINGS

The above and further objects and novel features of this invention will become more apparent from the following detailed description when the same is read in conjunction with the accompanying drawings, in which.

Figure 1:
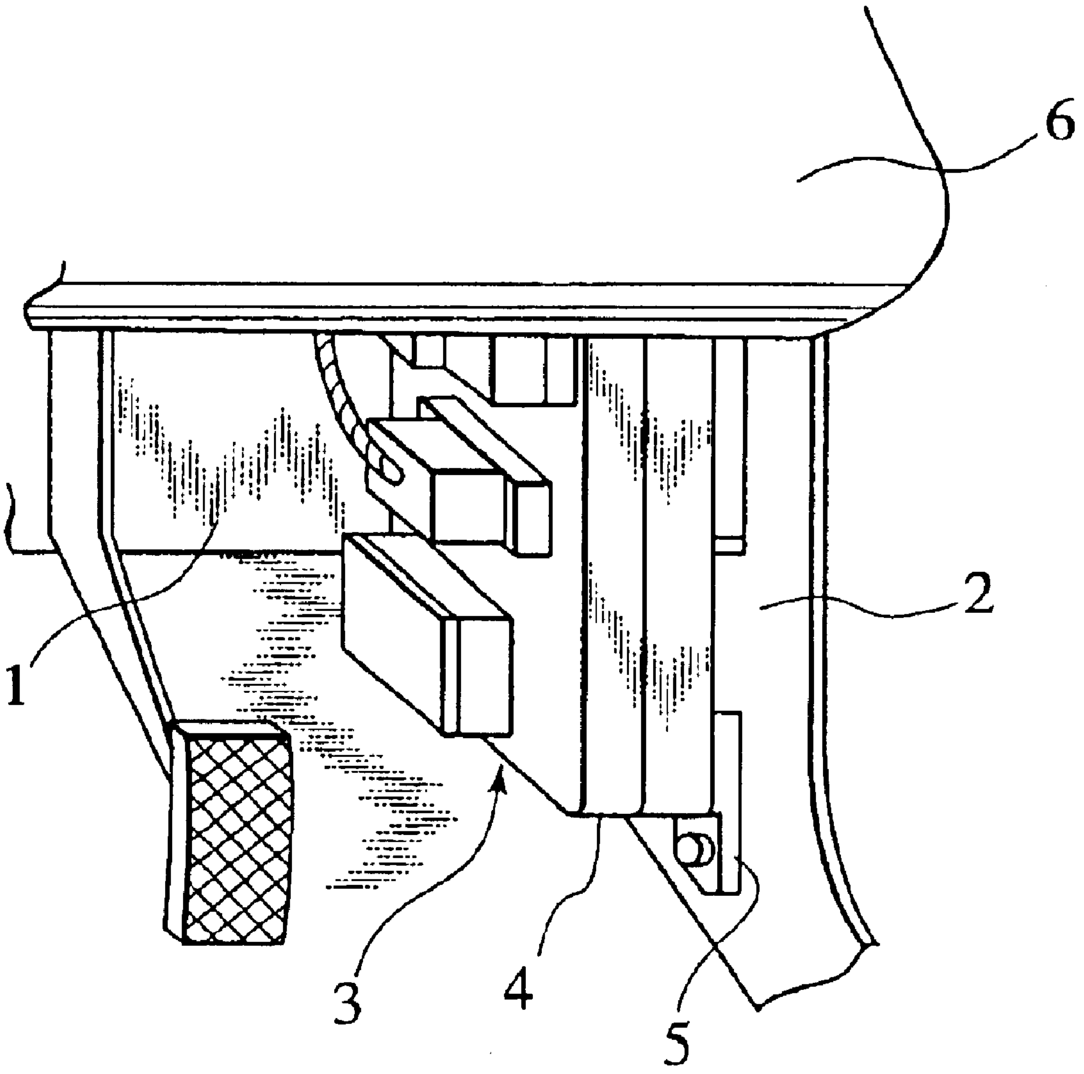
FIG. 1 PRIOR ART
FIG. 1 is a perspective view showing, as an example, a conventional mounting structure for an electrical connection box.
Figure 2A:
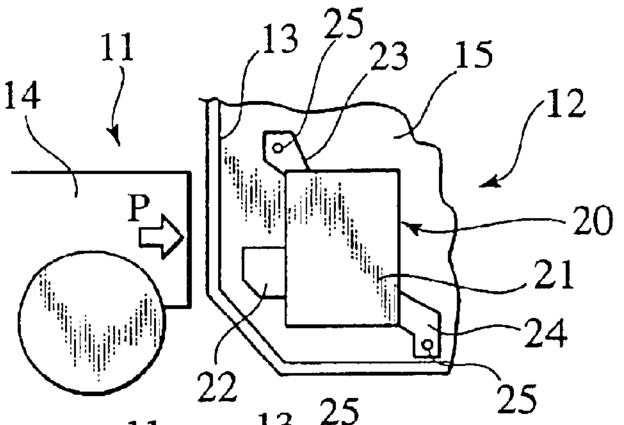
FIGS. 2A to 2D are schematic diagrams sequentially showing the behavior, upon collision of the vehicle, of an electrical connection box mounted to a vehicle according to an embodiment of this invention.
Figure 2B:
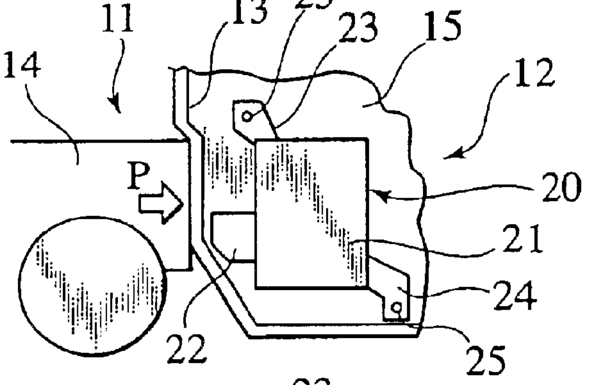
Figure 2C:
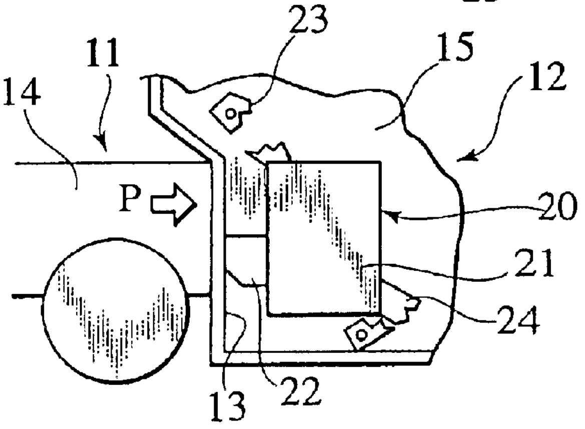
Figure 2D:
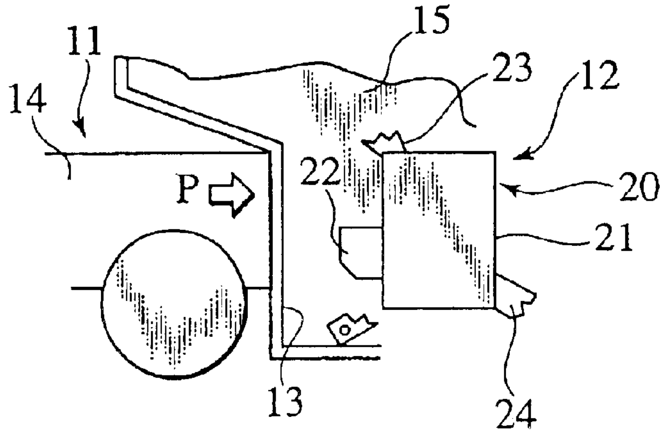
Figure 3A:
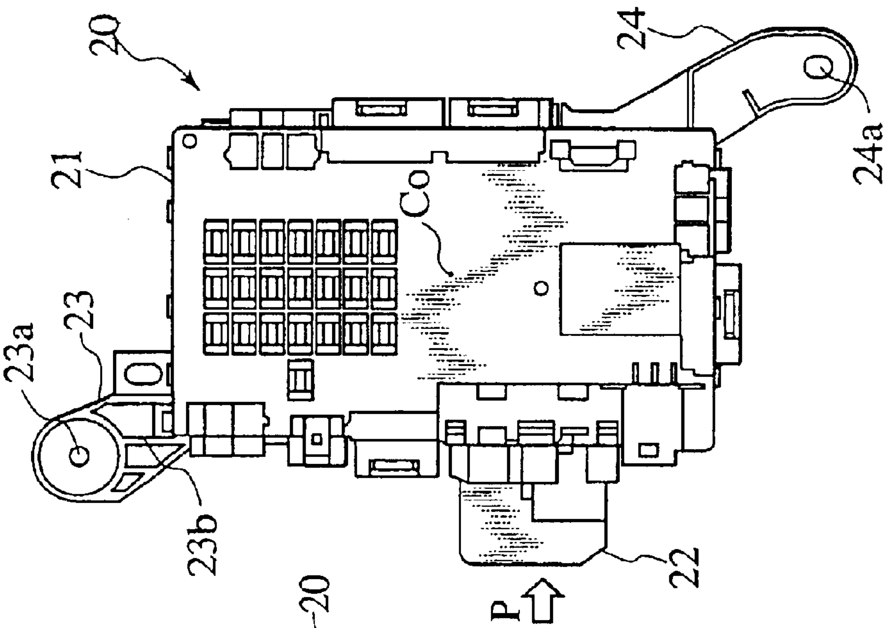
Figure 3B:
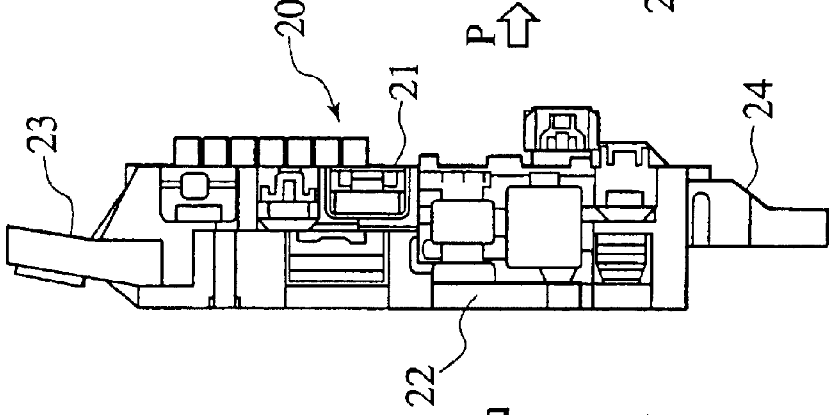
Figure 3C:
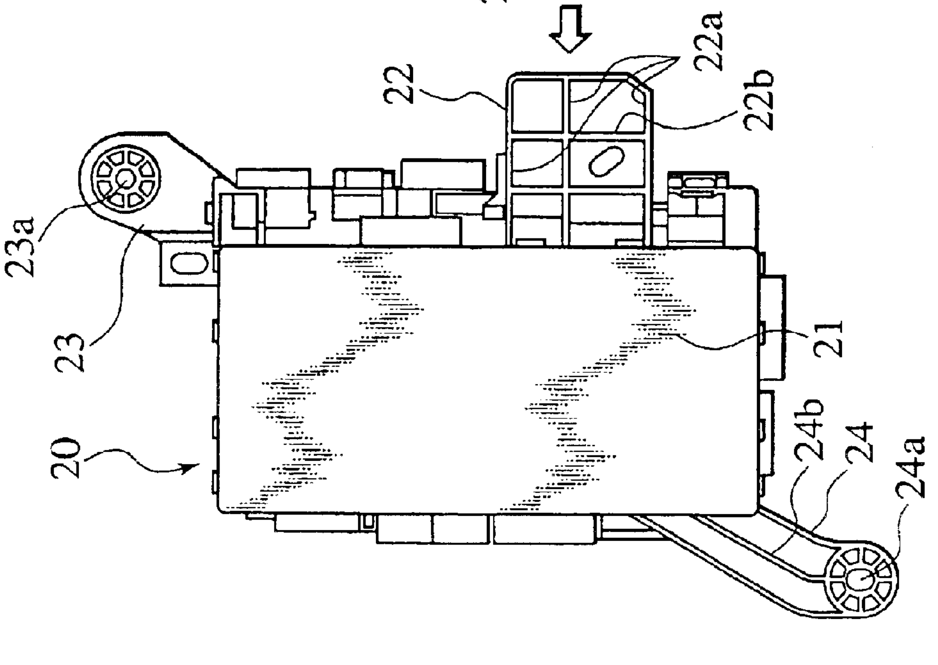
Figure 4A:
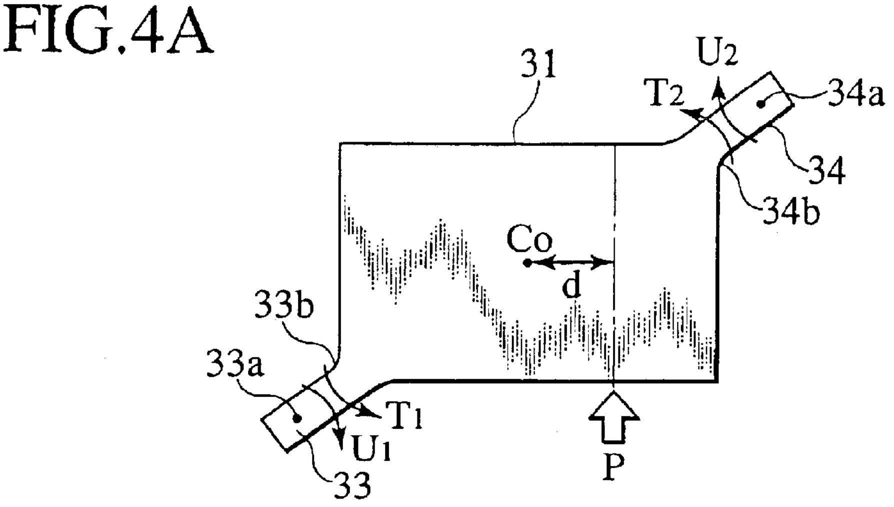
Figure 4B:
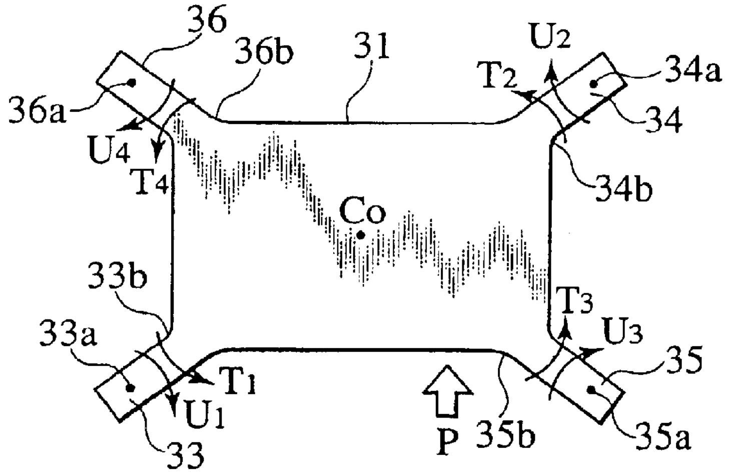
Figure 4C:
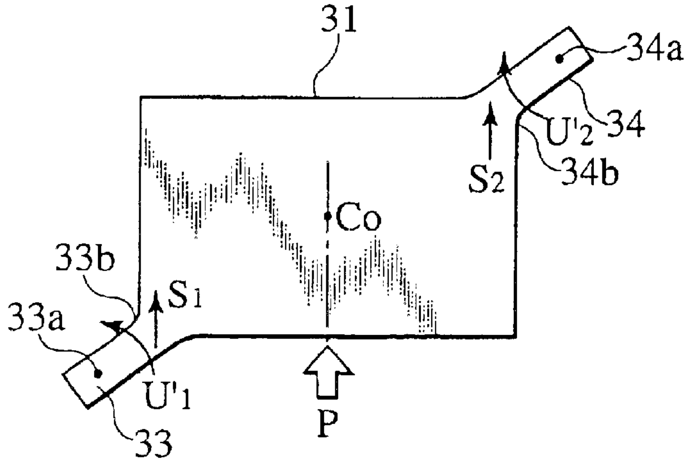

FIGS. 3A to 3C are, respectively, a front view, side view, and rear view of the electrical connection box according to the embodiment; and FIG. 4A is a conceptual diagram of a mounting structure according to the embodiment of this invention, FIG. 4B is a conceptual diagram of a mounting structure according to a modification of the embodiment, and FIG. 4C is a conceptual diagram of a mounting structure according to another modification of the embodiment.

DETAILED DESCRIPTION OF THE PREFERRED EMBODIMENTS

With reference to the accompanying drawings, preferred embodiments of this invention will be described below.

FIGS. 2A to 2D are side views sequentially showing how, upon collision of a vehicle, a mounting structure of a vehicle electrical connection box 20 according to an embodiment of this invention would be damaged. FIGS. 3A to 3C show details of the electrical connection box. Arrows "P" shown in the figures show the direction of impact force upon collision of the vehicle.

In this mounting structure, the electrical connection box 20 is arranged rearward of and in the vicinity of a dash panel 13 serving as a partition between an engine space 11 in the front portion of the vehicle and a compartment 12 positioned rearward of the room 11. The electrical connection box 20 has a box body 21 from which mounting members 23, 24 are extended. The electrical connection box 20 is screwed to a cowl side panel 15 using the mounting members 23, 24.

A protruding member 22 is formed, for example, on the front side surface of the box body 21 of the electrical connection box 20 which contains various sorts of electronic components and circuits, thereby receiving impact upon collision of the vehicle from the dash panel 13 positioned forward of it, for example, before the box body 21 does. The protruding member 22 is, as specifically shown in FIG. 3C, provided with horizontal ribs 22*a* for reinforcement extending along the direction "P" in which the impact from the dash panel 13 upon collision of the vehicle is transmitted, and vertical ribs 22*b* intersecting with the horizontal ribs 22*a* in a grid, improving its geometrical rigidity.

The mounting members 23, 24 extending from the box body 21 of the connection box 20 are formed to have such a rigidity as to allow the members 23, 24 to be broken to prevent crushing of the box body 21 when the protruding member 22 receives the impact of the collision of the vehicle, and load or stress exceeding a given limit is applied to the box body 21. More specifically, the mounting members 23, 24 are formed to extend from the box body 21 in directions intersecting with the direction "P" in which the impact from the dash panel 13 upon collision of the vehicle is transmitted, and ribs 23*b*, 24*b* are formed to extend in directions perpendicular to or intersecting with the impact transmitting direction "P" or in directions in which the mounting members are extended, as shown in FIGS. 3A to 3C. Thus the mounting members 23, 24 have high geometrical rigidity in their longitudinal directions. The mounting members 23, 24 are fixed to the side panel 15 via screws inserted into holes 23*a*, 24*a* provided to the front ends of the mounting members 23, 24. Consequently, when excessive impact load or torque is applied to the box body 21 in the direction of arrow "P", the mounting members 23, 24 are easily broken, preventing the crushing of the box body 21.

Now the action of impact force on the mounting structure will be described with reference to FIG. 4A showing a conceptual diagram according to the embodiment. A box body 31 (21) is supported via two mounting members 33 (23), 34 (24). The line of action of impact force P extends off (at distance "d" from) the center of rotation C0 of the box body 31. Consequently, the impact force P generates counterclockwise rotation moment around the center of rotation C0. As a result, counterclockwise force T1 acts on the box body 31 around a connection part 33*b* between the mounting member 33 and the box body 31, and clockwise force U1 acts on the mounting member 33 around a fixed part 33*a* (23*a*), thereby causing a stress concentration around the connection part 33*b*. Similarly, counterclockwise force T2 acts on the box body 31 around a connection part 34*b* between the mounting member 34 and the box body 31, and clockwise force U2 acts on the mounting member 34 around a fixed part 34*a* (24*a*), thereby causing a stress concentration around the connection part 34*b*.

In other words, portions of the impact force P act on the mounting members 33, 34 via the box body 31 (21) or the protruding member 22 and the box body 21, and portions of the impact force act on the mounting members 33, 34 in directions intersecting with the longitudinal directions of the mounting members, thereby effectively causing shearing stress. Thus shearing stress is concentrated around the two connection parts 33*b*, 34*b* almost simultaneously, so that the impact force P causes the mounting members 33, 34 to break, preventing the crushing of the box body, and thereby providing reliable protection for the box body 31 and the electrical connections. It is sufficient that at least one mounting member is broken in order to prevent the crushing of the box body. However, it is preferred that all the mounting members be broken substantially simultaneously to prevent the crushing of the box body.

Now the function of the embodiment will be described with reference to FIGS. 2A to 2D.

(1) In an early stage of collision of the vehicle, the electrical connection box 20 is still fixed to the side panel 15 by means of the mounting members 23, 24. At this stage, the pressure load has not yet acted on the electrical connection box 20, and the mounting members 23, 24 are not broken.

(2) Soon after, the dash panel 13 is pushed by a component 14 of the engine space 11 (such as the engine) in a rearward direction (into the compartment 12).

(3) The dash panel 13 then first comes into contact with the protruding member 22 provided to the box body 21 of the electrical connection box 20. The box body 21 receives the first impact through the protruding member 22 before directly receiving the impact. At almost the same time, an excessive impact load acts on the box body 21 of the electrical connection box 20 through the protruding member 22, and the mounting members 23, 24 fixing the electrical connection box 20 are broken to mitigate the impact applied to the box body 21.

(4) Thereafter, the dash panel 13 is further pushed rearward and crushes in on the mounting space of the electrical connection box 20. Since the electrical connection box 20 is no longer fixed to the side panel 15 with the mounting members 23, 24 being broken, it moves back rearward, thus avoiding being crushed. As a result, the electrical connections associated with the electrical connection box are protected.

Thus, through the action of the excessive load from the dash panel 13 upon collision of the vehicle, the mounting members 23, 24 supporting the box body 21 are broken, preventing the box body 21 of the electrical connection box 20 from receiving extensive damage and mitigating the impact acting on the box body 21, which is thrust rearward. This structure minimizes the damage to the box body 21, protecting the circuits contained inside.

The embodiment has been described in a case where impact from the dash panel or from the front upon collision of the vehicle is absorbed. It is also possible to provide a protruding member or a mounting member at a predetermined position around the box body of the electrical connection box to absorb impact from any directions including the rear and the side.

Modifications of the Embodiment

FIG. 4B shows a conceptual diagram of a modification of the above embodiment. The modification is different from the above embodiment only in that the box body 31 is further provided with mounting members 35, 36 in addition to the mounting members 33, 34. Specifically, in addition to stress concentration at the mounting members 33, 34, counterclockwise force T3 acts on the box body 31 around a connection part 35*b* between the mounting member 35 and the box body 31, and clockwise force U3 acts on the mounting member 35 around a fixed part 35*a*, thereby causing stress concentration around the connection part 35*b*. Similarly, counterclockwise force T4 acts on the box body 31 around a connection part 36*b* between the mounting member 36 and the box body 31 and a clockwise force U4 acts on the mounting member 36 around a fixed part 36*a*, thereby causing stress concentration around the connection part 36*b*. As a result, shearing stress concentrates around the connection parts 33*b*, 34*b*, 35*b* and 36*b* almost simultaneously, so that the mounting members 33 to 36 are broken due to the impact force P, preventing the box body 31 from crushing and resulting in reliable protection for the box body 31 and the electrical connections.

It is sufficient that at least one mounting member is broken to prevent the box body from crushing due to the action of the impact force P. And it is effective to provide different degrees of rigidity to the mounting members to allow a specified mounting member to be broken before another mounting member is broken. That is, the previous breakage of the specified mounting member when critical stress is applied to the connection part causes further stress concentration around the connection parts of the other mounting members to induce breakage thereof, thereby breaking all the mounting members more reliably to protect the box body 31.

FIG. 4C shows a conceptual diagram of another modification of the above embodiment. This modification is different from the embodiment as shown in FIG. 4A only in that the line of action of the impact force P substantially passes through the center of rotation C0. In this case, the impact force P does not substantially cause rotation moment around the center of rotation C0, although forces S1, S2 act in generally the same direction as that of the impact force P around the connection parts 33*b,* 34*b* of the respective mounting members. On the other hand, counterclockwise force U1' acts on the mounting member 33 around the fixed part 33*a,* and clockwise force U2' acts on the mounting member 34 around the fixed part 34*a.* As a result, stress concentration is caused around the connection parts 33*b,* 34*b,* and the mounting members 33, 34 are broken in result.

According to this invention, when a vehicle in a given position is pushed back in a given direction upon collision of the vehicle, the impact acts on a protruding member before acting on a box body of an electrical connection box, breaking mounting members supporting the box body at that moment, and mitigating direct impact to the box body. The breakage of the mounting members supporting the box body allows the box body to move back to the rear of the crushed mounting space for the electrical connection box, so that damage to the box body is minimized, enabling continuous supply of power. This allows electrical components such as door locks mounted to the vehicle to be kept at least operable, allowing the speedy rescue of vehicle occupants or the like.

In this mounting structure, a vehicle in a given position is pushed back in a given direction upon collision of the vehicle, the impact of which first acts on a protruding member provided to a box body of an electrical connection box. That is, the protruding member receives the first impact before the box body of the electrical connection box receives direct impact. Then, excessive load acts on the box body via the protruding member and breaks mounting members fixing the electrical connection box, thereby mitigating the impact applied to the box body. Thereafter, the given position of the vehicle may be pushed further back in the given direction and crush in on the mounting space for the electrical connection box. At that time, the electrical connection box is no longer fixed to a predetermined position of the vehicle because the mounting members have already been broken as described above, and is pushed back in a given direction, avoiding being crushed.

Further, according to this invention, ribs provided in the protruding member improve impact absorption performance, thereby further reducing damage to the electrical connection box.

Furthermore, according to this invention, the mounting members are easily broken when excessive load or rotation moment acts on the box body of the electrical connection box upon collision of the vehicle. This further mitigates the impact on the box body, thereby protecting circuits inside the box.

The present disclosure related to subject matter contained in Japanese Patent Application No. 2000-351476, filed on Nov. 17, 2000, the disclosure of which is expressly incorporated herein by reference in its entirety.

What is claimed is:

1. A mounting structure, comprising:

a vehicle electrical connection box having a box-shaped body;

a protruding member positioned to receive an impact from a first direction and protruding along the first direction from the electrical connection box, said protruding member including a horizontal reinforcement rib along the first direction and a vertical reinforcement rib intersecting the horizontal reinforcement rib; and at least one breakable mounting member protruding from the electrical connection box and configured to mount the electrical connection box to a part of a vehicle and to break due to a stress generated by the impact received by the protruding member.

2. A mounting structure according to claim 1, wherein at least a portion of the at least one breakable mounting member extends in a direction intersecting with the first direction.

3. A mounting structure according to claim 1, wherein the electrical connection box receives the impact off a center of rotation thereof.

4. A mounting structure according to claim 1, wherein the vertical reinforcement rib intersects the horizontal reinforcement rib substantially perpendicularly.

5. A mounting structure according to claim 1, wherein the at least one breakable mounting member extends substantially along an imaginary plane parallel to the first direction.

6. A mounting structure, comprising:

a vehicle electrical connection box having a box-shaped body positioned rearward of and in a vicinity of a dash panel serving as a partition between an engine space in a vehicle and an adjacent compartment;

a protruding member protruding from the electrical connection box toward the dash panel and positioned to receive an impact from a first direction, said protruding member including a horizontal reinforcement rib along the first direction and a vertical reinforcement rib intersecting the horizontal reinforcement rib; and at least one breakable planar mounting member protruding from the electrical connection box and configured to mount the electrical connection box to a cowl side panel of the vehicle and to break due to a stress generated by the impact received by the at least one breakable planar mounting member, wherein the dash panel is positioned substantially perpendicular to the cowl side panel.

7. A mounting structure according to claim 6, wherein the electrical connection box receives the impact off a center of rotation thereof.

8. A mounting structure according to claim 6, wherein at least a portion of the at least one breakable planar mounting member extends in a direction intersecting with a direction in which the impact is transmitted.

9. A mounting structure according to claim 6, wherein the vertical reinforcement rib intersects the horizontal reinforcement rib substantially perpendicularly.

10. A mounting structure according to claim 6, wherein the at least one breakable planar mounting member extends in a direction intersecting the first direction.

11. A mounting structure according to claim 6, wherein the at least one breakable planar mounting member has a principal plane substantially parallel to a direction which the protruding member is protruding.

12. A mounting structure, comprising:

a vehicle electrical connection box having a box-shaped body; and at least two breakable planar mounting members protruding from the electrical connection box and configured to mount the electrical connection box to a part of a vehicle, to break after the electrical connection box receives an impact, said at least two breakable planar mounting members being diagonally positioned relative to the electrical connection box and extending substantially along a first plane.

13. A mounting structure according to clainy 12, wherein the breakable planar mounting members have principal planes substantially parallel to the first plane.

14. A mounting structure according to claim 12, wherein the electrical connection box receives the impact in a direction substantially parallel to the first plane.

* * * * *